(12) United States Patent (10) Patent No.: US 12,494,806 B2
Luan et al. (45) Date of Patent: Dec. 9, 2025

(54) AMPLITUDE OFFSET CALIBRATION METHOD, DEVICE, AND STORAGE MEDIUM

(71) Applicant: RDA MICROELECTRONICS (BEIJING) CO., LTD., Beijing (CN)

(72) Inventors: Yifu Luan, Beijing (CN); Kai Li, Beijing (CN); Liyun Luo, Beijing (CN); Lichao Hu, Beijing (CN)

(73) Assignee: RDA MICROELECTRONICS (BEIJING) CO., LTD., Beijing (CN)

( * ) Notice: Subject to any disclaimer, the term of this patent is extended or adjusted under 35 U.S.C. 154(b) by 527 days.

(21) Appl. No.: 18/149,173

(22) Filed: Jan. 3, 2023

(65) Prior Publication Data

US 2023/0147812 A1    May 11, 2023

Related U.S. Application Data

(63) Continuation of application No. PCT/CN2020/101103, filed on Jul. 9, 2020.

(30) Foreign Application Priority Data

Jul. 3, 2020 (CN) .................... 202010629784.X

(51) Int. Cl.
*H04B 1/04* (2006.01)
*H04B 17/21* (2015.01)

(52) U.S. Cl.
CPC ......... *H04B 1/0475* (2013.01); *H04B 17/21* (2015.01); *H04B 2001/0425* (2013.01)

(58) Field of Classification Search
CPC .................. H04B 1/04; H04B 1/0475; H04B 2001/0408; H04B 1/0425; H04B 1/0433;
(Continued)

(56) References Cited

U.S. PATENT DOCUMENTS 7,082,290 B2 *  7/2006  Takano ................. H04L 27/368
                                                                    455/102
7,894,545 B1 *  2/2011  Groe .................... H04L 27/361
                                                                    375/295
(Continued)

FOREIGN PATENT DOCUMENTS

CN       1413387 A      4/2003
CN     101080031 A     11/2007
(Continued)

OTHER PUBLICATIONS

CN101635697A, "Transmitter and transmitter signal processing method", Yang et al., Jan. 27, 2010. (English Machine Translation) (Year: 2010).*

(Continued)

*Primary Examiner* — Quochien B Vuong
(74) *Attorney, Agent, or Firm* — Kilpatrick Townsend & Stockton LLP

(57) ABSTRACT

The present disclosure provides an amplitude offset calibration method. The method includes: obtaining at least two test feedback signals, where the test feedback signals are analog signals obtained by a transmitter in a test mode according to a test signal, at least two test signals in one-to-one correspondence to the at least two test feedback signals are digital signals pre-generated by the transmitter, and amplitudes of the at least two test signals are different; obtaining at least two corresponding baseband signals according to the at least two test feedback signals, where the baseband signals are a digital signal, and the baseband signals are in one-to-one correspondence to the test feedback signals; and determining an amplitude offset value according to the at least two test signals and the at least two baseband signals.

20 Claims, 4 Drawing Sheets

(58) Field of Classification Search
CPC ........ H04B 1/045; H04B 17/00; H04B 17/10; H04B 17/11; H04B 17/13; H04B 17/14; H04B 17/15; H04B 17/16; H04B 17/19
See application file for complete search history.

(56) References Cited

U.S. PATENT DOCUMENTS

| | | | |
|---|---|---|---|
| 8,045,926 B2 * | 10/2011 | Martikkala | H04B 17/327 455/63.4 |
| 8,060,038 B2 * | 11/2011 | Otaka | H04B 1/0475 455/127.1 |
| 2009/0141830 A1 | 6/2009 | Ye | |

FOREIGN PATENT DOCUMENTS

| | | |
|---|---|---|
| CN | 101411155 A | 4/2009 |
| CN | 101490997 A | 7/2009 |
| CN | 101635697 A | 1/2010 |
| CN | 102231620 A | 11/2011 |
| CN | 202121602 U | 1/2012 |
| CN | 102340467 A | 2/2012 |
| CN | 102638319 A | 8/2012 |
| CN | 103166906 A | 6/2013 |
| CN | 106330802 A | 1/2017 |
| CN | 108776330 A | 11/2018 |
| CN | 109565482 A | 4/2019 |
| CN | 109617560 A | 4/2019 |
| CN | 110708082 A | 1/2020 |

OTHER PUBLICATIONS

The first Office Action received in the corresponding CN Application 202010629784.X, mailed Apr. 27, 2021.

The international search report and written opinion received in corresponding International Application PCT/CN2020/101103, mailed Mar. 26, 2021.

* cited by examiner

AMPLITUDE OFFSET CALIBRATION METHOD, DEVICE, AND STORAGE MEDIUM

CROSS-REFERENCE TO RELATED APPLICATIONS

This application is a continuation application of International Application No. PCT/CN2020/101103, filed on Jul. 9, 2020, which claims priority to Chinese Patent Application No. 202010629784.X, filed on Jul. 3, 2020, both of which are hereby incorporated by reference in their entireties.

TECHNICAL FIELD

The present disclosure relates to the technical field of wireless communication, and particularly to an amplitude offset calibration method, a device, and a storage medium.

BACKGROUND

With the continuous development of wireless communication technology, people hope that the power consumption of a communication device gets lower and lower. Compared with a commonly used direct quadrature up-conversion transmitter, a polar transmitter is advantaged in power consumption and area, and has a broad application prospect.

Due to a circuit structure of a polar transmitter and the impact of environmental factors, an amplitude offset of a radio frequency signal to be transmitted in the polar transmitter is inevitable. However, calibration and compensation are usually performed only for nonlinearity of the amplitude in the prior art, such as a Digital Pre-Distortion (DPD) technology.

However, DPD calibration cannot deal with amplitude offsets, and the existence of the amplitude offset may worsen a nonlinearity calibration effect.

SUMMARY

The present disclosure provides an amplitude offset calibration method, a device, and a storage medium, which may implement accurate calibration of an amplitude offset of a transmitter.

According to a first aspect, an embodiment of the present disclosure provides an amplitude offset calibration method, applied to an electronic device and including:

obtaining at least two test feedback signals, where the test feedback signals are analog signals obtained by a transmitter in a test mode according to a test signal, at least two test signals in one-to-one correspondence to the at least two test feedback signals are digital signals pre-generated by the transmitter, and amplitudes of the at least two test signals are different;

obtaining at least two corresponding baseband signals according to the at least two test feedback signals, where the baseband signals are digital signals, and the baseband signals are in one-to-one correspondence to the test feedback signals; and determining an amplitude offset value according to the at least two test signals and the at least two baseband signals, where the amplitude offset value is used for calibrating an amplitude offset of the transmitter.

According to a second aspect, an embodiment of the present disclosure provides an electronic device, including:

a test feedback signal obtaining unit, configured to obtain at least two test feedback signals, where the test feedback signals are analog signals obtained by a transmitter in a test mode according to a test signal, at least two test signals in one-to-one correspondence to the at least two test feedback signals are digital signals pre-generated by the transmitter, and amplitudes of the at least two test signals are different;

a test feedback signal processing unit, configured to obtain at least two corresponding baseband signals according to the at least two test feedback signals, where the baseband signals are digital signals, and the baseband signals are in one-to-one correspondence to the test feedback signals; and an amplitude offset determining unit, configured to determine an amplitude offset value according to the at least two test signals and the at least two baseband signals, where the amplitude offset value is used for calibrating an amplitude offset of the transmitter.

According to a third aspect, an embodiment of the present disclosure provides a storage medium, including a readable storage medium and a computer program, where the computer program is configured to implement the amplitude offset calibration method as described in the first aspect.

According to a fourth aspect, an embodiment of the present disclosure provides a chip running an instruction, where the chip includes a memory and a processor, the memory stores a code and data, the memory is coupled to the processor, and the processor runs the code in the memory such that the chip is configured to perform the steps of the amplitude offset calibration method as described above.

According to a fifth aspect, an embodiment of the present disclosure provides a program product including an instruction, where the program product, when running on a computer, enables the computer to perform the steps of the amplitude offset calibration method as described above.

According to a sixth aspect, an embodiment of the present disclosure provides a computer program, where the computer program, when executed by a processor, is configured to perform the steps of the amplitude offset calibration method as described above.

BRIEF DESCRIPTION OF DRAWINGS

In order to describe the technical solutions in the embodiments of the present disclosure or the prior art more clearly, the drawings required to be used in descriptions about the embodiments or the prior art will be briefly introduced below. Apparently, the drawings in the description below are some embodiments of the present disclosure. Other drawings may further be obtained by those of ordinary skill in the art according to these drawings without creative work.

DESCRIPTION OF EMBODIMENTS

In order to make the objective, technical solutions, and advantages of the embodiments of the present disclosure clearer, the technical solutions in the embodiments of the present disclosure will be described clearly and completely below in combination with the drawings in the embodiments of the present disclosure. Clearly, the described embodiments are not all but part of embodiments of the present disclosure. All other embodiments obtained by those of ordinary skill in the art based on the embodiments in the present disclosure without creative work shall fall within the scope of protection of the present disclosure.

Transmitters are extensively applied to the fields of television, broadcast, communication, alarm, radar, remote control, etc. At present, a polar transmitter implemented based on a polar architecture converts a digital-domain baseband signal into an analog signal through a circuit of an analog part, and performs filtering and other processing to obtain a corresponding AM signal to directly control a collector voltage of a Power Amplifier (PA) with the AM signal, so that the power amplification efficiency of the PA may be improved effectively. Moreover, compared with a direct quadrature up-conversion transmitter, the polar transmitter is smaller in area of a circuit arranged in a chip and lower in power consumption. In application, the polar transmitter inevitably has an amplitude offset. In order to solve the problem of impact of distortion of a radio frequency signal output by the polar transmitter on the performance of the transmitter due to the amplitude offset of the polar transmitter, it is necessary to adjust the amplitude offset generated by the circuit of the analog part of the transmitter.

Figure 1:
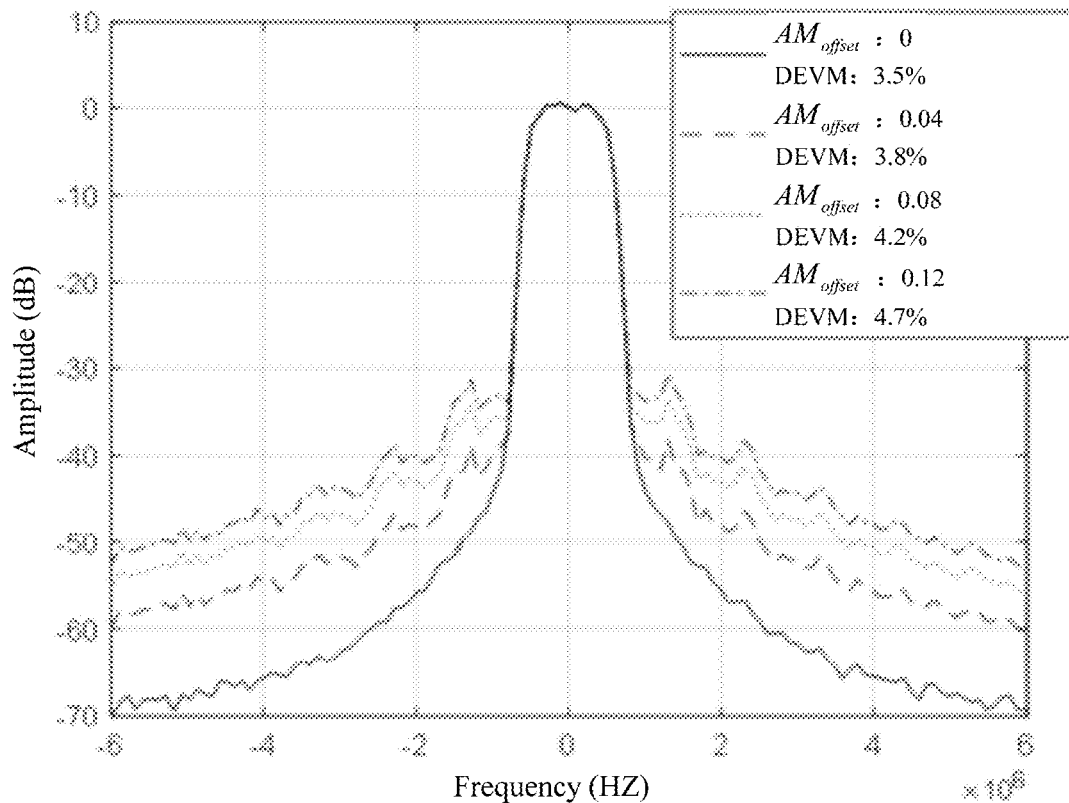
FIG. 1 is a schematic diagram of an emission spectrum according to an embodiment of the present disclosure.

For example, an amplitude nonlinearity AM-AM feature is calibrated in a DPD manner, so as to implement calibration of the amplitude nonlinearity of the radio frequency signal. However, a amplitude nonlinearity distortion that may be modeled as an AM-AM curve in the process of converting the AM signal into an input voltage of the PA in the circuit of the analog part is unsuitable for the amplitude offset. FIG. 1 is a schematic diagram of an emission spectrum according to an embodiment of the present disclosure. In the polar transmitter, an amplitude offset value $AM_{offset}$ may be regarded as a fixed offset of an AM path, which may reduce the performance of the transmitter. Taking an Enhanced Data Rate-3 (EDR-3) signal in a Bluetooth protocol as an example, an emission spectrum in the presence of $AM_{offset}$ is as shown in FIG. 1, and a Differential Error Vector Magnitude (DEVM) of a baseband signal to be transmitted and in-band emissions are both worsened to different extents. For example, when there is an amplitude offset, namely the amplitude offset value $AM_{offset}$ is 0, the DEVM is 3.5%; when the amplitude offset value $AM_{offset}$ is 0.04, the DEVM is 3.8%; when the amplitude offset value $AM_{offset}$ is 0.08, the DEVM is 4.2%; and when the amplitude offset value $AM_{offset}$ is 0.12, the DEVM is 4.7%.

For another example, a control loop may be added to the analog part of the transmitter to implement calibration and compensation of the amplitude offset value in an analog domain, so as to implement calibration of the amplitude offset. However, the added control loop may inevitably enlarge the area of the circuit and increase the power consumption of the system.

In order to solve the foregoing problems, in the embodiments of the present disclosure, the amplitude offset value of the transmitter is estimated in advance in a digital domain, and the AM signal not subjected to digital-analog conversion is adjusted in advance by the transmitter. For example, a difference between an amplitude of each data sampling point and the amplitude offset value is calculated to compensate an actual amplitude offset value of the AM signal processed by the analog part.

Figure 2:
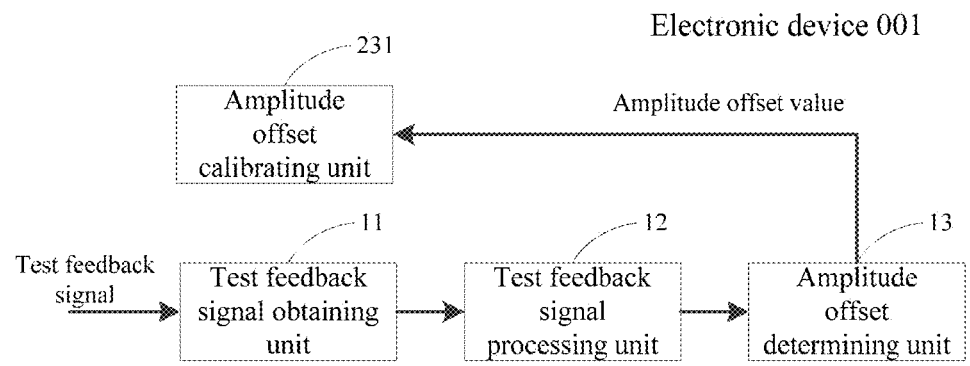
FIG. 2 is a schematic structural diagram of an electronic device according to an embodiment of the present disclosure.

FIG. 2 is a schematic structural diagram of an electronic device according to an embodiment of the present disclosure. An executive entity of the embodiment of the present disclosure is an electronic device. Illustratively, the electronic device may be any device with a communication function, such as a mobile phone, a computer, a television, a tablet computer, a smart wearable device, and a smart speaker. It is to be understood that at least a transmitter, such as a polar transmitter, is deployed in the electronic device. The electronic device may also be composed of a receiver, a control chip, an antenna, and other devices, as well as a transmitter together.

Illustratively, the electronic device 001 at least includes a test feedback signal obtaining unit 11, test feedback signal processing unit 12, and amplitude offset determining unit 13 shown in FIG. 2. The test feedback signal obtaining unit 11 is electrically connected with the test feedback signal processing unit 12. Optionally, the test feedback signal obtaining unit 11 may be a signal receiving interface that may be integrated into the test feedback signal processing unit 12. The amplitude offset determining unit 13 is connected with the test feedback signal processing unit 13 and an amplitude offset calibrating unit 231 respectively.

The test feedback signal obtaining unit 11 obtains at least two test feedback signals corresponding to each test signal. The at least two test feedback signals are in one-to-one correspondence to at least two test signals. Illustratively, the test feedback signal obtaining unit 11 may directly receive the test feedback signal sent by a signal processing unit of the transmitter, or may obtain the test feedback signal according to the test signal, and no limits are made thereto in this solution. For example, after the electronic device 001 starts a test mode, the transmitter deployed in the electronic device 001 generates at least two test signals, obtains a test feedback signal corresponding to each test signal according to each test signal, and sends the test feedback signal to the test feedback signal obtaining unit 11. Amplitudes of the at least two test signals are different. Optionally, the amplitudes of the two test signals may be set reasonably to improve the calibration effect. For example, the amplitudes of the two test signals are set close, or the at least two test signals are set in a relatively linear region of a PA.

It is to be understood that the test feedback signal obtaining unit 11 may be arranged in the transmitter of the electronic device 001, or arranged in the receiver of the electronic device 001, or arranged in the control chip of the electronic device 001, and no limits are made thereto in this solution.

Illustratively, the test signal is a baseband signal in a digital domain, and the test feedback signal is an analog signal obtained by performing digital-analog conversion and other processing on the test signal.

The test feedback signal obtaining unit 11 sends the test feedback signal to the test feedback signal processing unit 12. The test feedback signal processing unit 12 obtains at least two corresponding baseband signals according to the at least two test feedback signals. It is to be understood that the baseband signal is a digital signal, and the baseband signals are in one-to-one correspondence to the test feedback signals. Since the test feedback signals are also in one-to-one correspondence to the test signals, the baseband signals are in one-to-one correspondence to the test signals.

Illustratively, the test feedback signal processing unit 12 may be a circuit arranged in the transmitter of the electronic device 001 and connected with an output end of the signal processing unit of the transmitter, or in order to further reduce the size of the electronic device 001, may reuse an existing receiving path in the receiver, such as a quadrature down-conversion path or a squaring circuit path, etc., to process the test feedback signal.

Further, the test feedback signal processing unit 12 sends the at least two baseband signals to the amplitude offset determining unit 13. The amplitude offset determining unit 13 determines an amplitude offset value according to the at least two test signals and the at least two baseband signals, and if there has been an amplitude offset value, updates the existing amplitude offset value. Illustratively, the amplitude offset determining unit 13 may be implemented by a software program and arranged in the control chip of the electronic device 001, or a chip of the transmitter, or a chip of the receiver, and no limits are made thereto in the present disclosure.

It is to be understood that the current test mode is ended after the amplitude offset value is obtained. The transmitter deployed in the electronic device 001 is started to enter a working mode to generate a baseband signal to be transmitted, perform signal processing on the baseband signal, such as digital-analog conversion, filtering, and power amplification, etc., to obtain a radio frequency signal to be transmitted, and calibrate an amplitude offset of the transmitter according to the amplitude offset value. Illustratively, as shown in FIG. 2, the electronic device 001 further includes the amplitude offset calibrating unit 231. The amplitude offset calibrating unit 231 performs, according to the amplitude offset value, amplitude offset compensation on an AM signal obtained by performing coordinate rotation on the baseband signal to cancel the amplitude offset of the AM signal generated in the processing processes of digital-analog conversion, filtering, power amplification, etc.

The amplitude offset calibrating unit 231 is generally arranged in the transmitter of the electronic device 001.

In the embodiment of the present disclosure, the electronic device 001 includes the test feedback signal obtaining unit 11, the test feedback signal processing unit 12, and the amplitude offset determining unit 13. The at least two test feedback signals output by the output end of the transmitter are obtained, the at least two test feedback signals are processed to finally convert the at least two test feedback signals into the corresponding baseband signals in the digital domain, and then the amplitude offset value of the transmitter is determined according to the at least two test signals and the corresponding baseband signals, such that the transmitter may compensate the AM signal in the digital domain according to the amplitude offset value to implement calibration of the amplitude offset.

Figure 3:
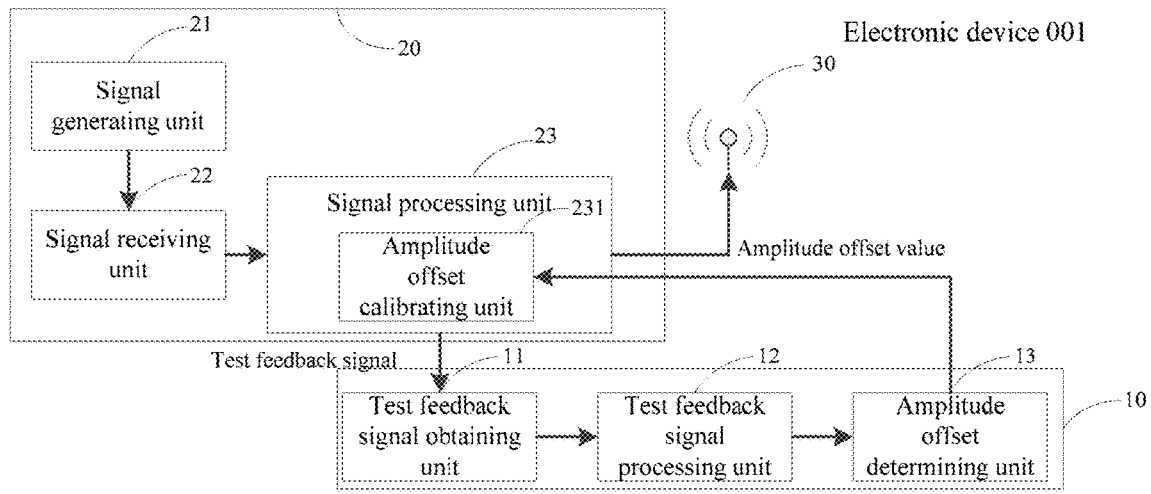
FIG. 3 is a schematic structural diagram of an electronic device according to an embodiment of the present disclosure.

In order to simplify a structural design of the electronic device 001, the test feedback signal processing unit in the embodiment of the present disclosure may be implemented by reusing the receiving path in the receiver. FIG. 3 is a schematic structural diagram of an electronic device according to an embodiment of the present disclosure. As shown in FIG. 3, the electronic device 001 in the embodiment of the present disclosure includes a receiver 10, a transmitter 20, and an antenna 30. The test feedback signal obtaining unit 11, test feedback signal processing unit 12, and amplitude offset determining unit 13 in the embodiment shown in FIG. 2 are arranged in the receiver 10.

The transmitter 20 is connected with the receiver 10 and the antenna 30 respectively. The transmitter 20 generates and transmits a radio frequency signal to the antenna 30, and communicates with other devices through the antenna 30.

An output end of the transmitter 20 is connected with a receiving end of the receiver 10, such as the test feedback signal obtaining unit 11. Illustratively, the test feedback signal obtaining unit 11 may be integrated into the test feedback signal processing unit 12. In a test mode, the transmitter 20 sends a test feedback signal to the receiver 10, and the receiver 10 obtains a baseband signal according to the test feedback signal, further determines an amplitude offset value, and sends the amplitude offset value to the transmitter 20, such that the transmitter performs amplitude offset calibration on an AM signal in a working mode according to the amplitude offset value.

Illustratively, the transmitter 20 at least includes a signal receiving unit 22 and a signal processing unit 23. The signal receiving unit 22 may receive a signal sent by any device in the electronic device, or receive a signal generated by a signal generating unit 21 in the transmitter 20. When multiple test signals are required, the signal generating unit 21 may sequentially generate each test signal.

In the test mode, the signal generating unit 21 generates a test signal, and the signal receiving unit 22 receives the test signal. Illustratively, the signal receiving unit 22 may be a signal receiving interface that may be integrated into the signal processing unit 23.

Illustratively, a Coordinate Rotation Digital Computer (CORDIC) module is arranged in the signal processing unit 23. The CORDIC module performs coordinate rotation on the test signal received by the signal receiving unit 22 to obtain an AM signal and a Phase Modulator (PM) signal.

Further, the signal processing unit 23 performs digital-analog conversion, filtering, power amplification, and other processing on the AM signal to obtain a test feedback signal. Illustratively, if there has been an amplitude offset value, which may be a preset amplitude offset value or an amplitude offset value determined in last operation in the test mode, an amplitude offset calibrating unit 231 in the signal processing unit 23 compensates the AM signal in advance according to the amplitude offset value before digital-analog conversion of the AM signal. If there is currently no amplitude offset value, the amplitude offset calibrating unit 231 does not perform amplitude compensation.

Illustratively, the signal processing unit 23 further modulates the PM signal through a Signal-Delta Modulation (SDM), inputs the modulated PM signal to a Phase Locked Loop (PLL), then inputs a signal output by the PLL to a PA together with the AM, obtains a radio frequency signal to be output through the PA, sends the radio frequency signal to the antenna 30 through an output end of a coupler, and outputs a component of the radio frequency signal to the receiver 10 as the test feedback signal through a coupling end of the coupler, such that the receiver 10 determines the amplitude offset value according to the test feedback signal. Illustratively, no PM signal is required in the test mode, so coordinate rotation is performed on the test signal generated by the signal generating unit 21 to obtain the AM signal as well as the PM signal with a fixed value.

The amplitude offset calibrating unit 231 compensates the amplitude offset of the AM signal in next operation in the test mode according to the amplitude offset value, or compensates the amplitude offset of the AM signal in the working mode after the end of the test mode.

After the amplitude offset value is determined, the electronic device 001 may be set in the working mode. In such case, the signal generating unit 21 generates a baseband signal to be output (such as an In-phase/Quadrature (I/Q) modulation signal), and the signal receiving unit 22 receives the baseband signal. Further, the signal processing unit 23 may perform coordinate rotation on the baseband signal through the CORDIC module to obtain the corresponding AM signal and PM signal.

The amplitude offset calibrating unit 231 in the signal processing unit 23 compensates the amplitude offset of the AM signal in advance to implement calibration of the amplitude offset of the AM signal, thereby avoiding distortion of the radio frequency signal to be output.

Figure 4:
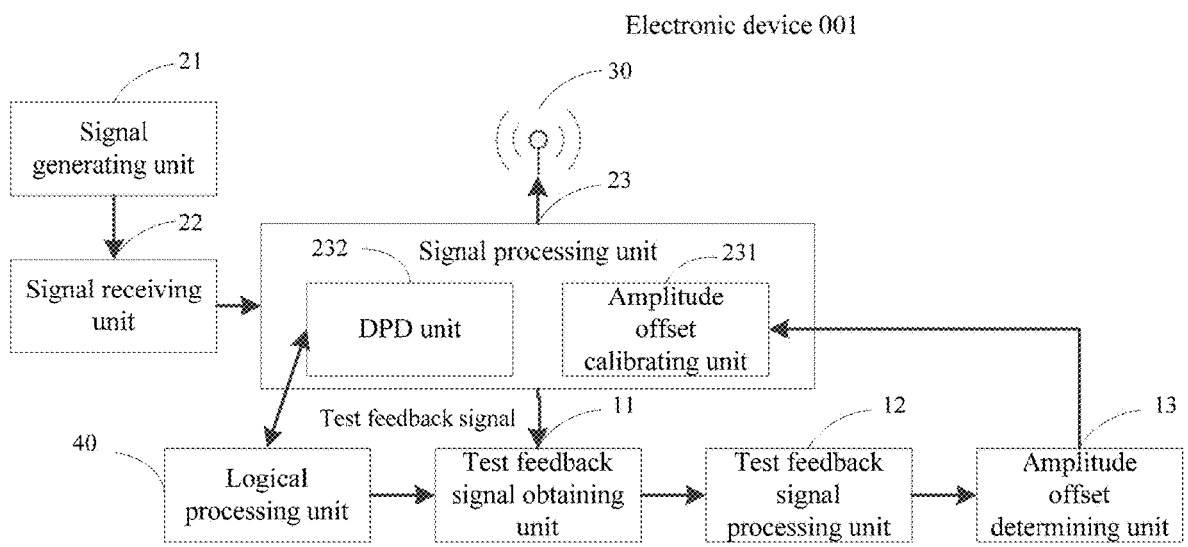
FIG. 4 is a schematic structural diagram of an electronic device according to an embodiment of the present disclosure.

In the embodiment of the present disclosure, in order to improve the accuracy of amplitude calibration of the transmitter, a DPD training process is combined with a process of determining the amplitude offset value to improve the accuracy of DPD calibration and amplitude offset estimation, and then the amplitude of the transmitter is calibrated based on trained DPD and the amplitude offset value. FIG. 4 is a schematic structural diagram of an electronic device according to an embodiment of the present disclosure. As shown in FIG. 4, the electronic device 001 further includes a DPD unit 232 and a logical processing unit 40.

When the electronic device 001 is in a DPD training mode, the signal receiving unit 22 receives an input training sequence, where the training sequence includes a plurality of training signals. Illustratively, the training sequence may be generated by the signal generating unit 21. The signal receiving unit 22 sends the training sequence to the signal processing unit 23.

The DPD unit 232 in the signal processing unit 23 obtains a feedback signal corresponding to each training signal, where the feedback signal is an analog signal that has been compensated according to the amplitude offset value and output by the PA. Illustratively, the amplitude offset calibrating unit in the signal processing unit 23 performs amplitude compensation in advance on each training signal in the training sequence, and performs digital-analog conversion, filtering, power amplification, and other processing on the training signal subjected to amplitude compensation to obtain the feedback signal.

The DPD unit 232 determines a DPD processing coefficient according to the plurality of training signals and the corresponding feedback signals.

It is to be understood that the test mode is required to be activated every time when a DPD coefficient is required to be determined according to the training sequence. The test mode may be activated by the logical processing unit 40 after the electronic device 001 receives the training sequence, and the amplitude offset value is determined or updated based on the content provided in any one of the above-mentioned embodiments.

The logical processing unit 40 controls the training process in the present embodiment to be executed repeatedly, determines whether the number of times of executing the training process reaches a preset number of times, and if the preset number of times is reached, determines the DPD processing coefficient obtained by the DPD unit 232 by training as a final DPD processing coefficient.

Illustratively, the logical processing unit 40 may be arranged in any one of the control chip, the transmitter, and the receiver, and no limits are made thereto in this solution.

After the DPD processing coefficient is determined, the electronic device 001 enters the working mode. In such case, the signal generating unit 21 generates a baseband signal to be output (such as an I/Q modulation signal), and the signal receiving unit 22 receives the baseband signal, and sends the baseband signal to the signal processing unit 23. Further, the signal processing unit 23 may perform coordinate rotation on the baseband signal through the CORDIC module to obtain a corresponding AM signal and PM signal.

The DPD unit 232 in the signal processing unit 23 performs DPD processing on the AM signal according to the DPD processing coefficient obtained in the training process, and sends a processed AM signal to the amplitude offset calibrating unit 231. The amplitude offset calibrating unit 231 compensates the amplitude offset of the AM signal in advance to implement calibration of the amplitude offset of the AM signal, thereby avoiding distortion of the radio frequency signal to be output. Optionally, the DPD unit 232 may also perform DPD processing on the received PM signal.

Optionally, the DPD unit 232 and CORDIC module in the signal processing unit 23 may be in different sequences according to an actual application scenario. For example, the signal processing unit 23 may first perform DPD processing on the received baseband signal through the DPD unit 232 according to the DPD processing coefficient obtained in the training process, and then perform coordinate rotation on the processed baseband signal through the CORDIC module to obtain the corresponding AM signal and PM signal. A sequence of DPD processing and coordinate rotation processing is not limited in this solution.

Figure 5:
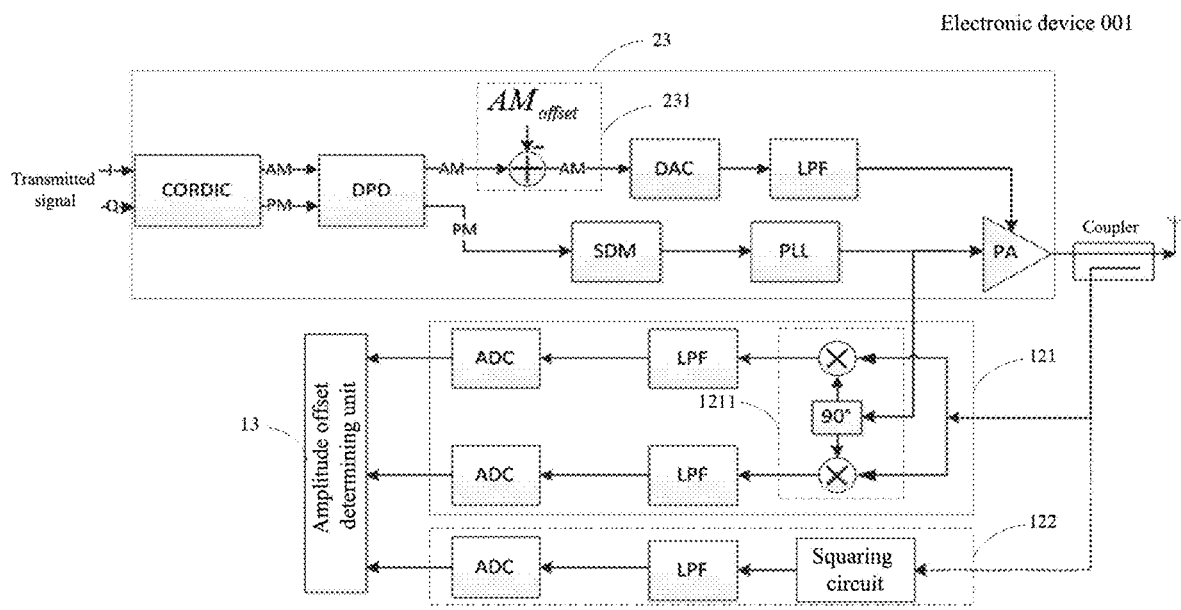
FIG. 5 is a schematic structural diagram of an electronic device according to an embodiment of the present disclosure.

Based on the above embodiments, FIG. 5 is a schematic structural diagram of an electronic device according to an embodiment of the present disclosure.

As a specific implementation, in the embodiment of the present disclosure, as shown in FIG. 5, the signal receiving unit 22 of the electronic device 001 may be a signal receiving interface that may be integrated into the signal processing unit 23.

Illustratively, the signal processing unit 23 includes a CORDIC module, and the CORDIC module performs coordinate rotation on a received I/Q signal to obtain an AM signal and a PM signal.

The signal processing unit 23 further includes a DPD unit 232. The DPD unit 232 includes a DPD module. Optionally, a sequence of the CORDIC module and the DPD module is not limited in the embodiment of the present disclosure. That is, the DPD module may receive the I/Q signal, and perform DPD processing on the I/Q signal, and then the CORDIC module performs coordinate rotation on the processed I/Q signal to obtain the AM signal and the PM signal.

Further, an AM path and a PM path are connected to the DPD module. An amplitude offset calibrating unit 231 is arranged in the AM path. Illustratively, a Digital-Analog Converter (DAC) and a Low Pass Filter (LPF) are further arranged in the AM path. An SDM and a PLL are arranged in the PM path. Further, the signal processing unit 23 further includes a PA. An output end of the LPF in the AM path is connected with a collector of the PA.

The PA is connected with a coupler. An output end of the coupler is connected to an antenna, while a coupling end of the coupler is connected to the test feedback signal processing unit 12.

Based on any one of the above-mentioned embodiments, the embodiment of the present disclosure provides the following two possible implementations for obtaining at least two corresponding baseband signals according to the at least two test feedback signals.

In the first mode, quadrature down-conversion processing is performed respectively, through a quadrature down-conversion path, on each test feedback signal according to a carrier signal sent by a PLL of the transmitter to obtain the baseband signal corresponding to each test feedback signal.

Illustratively, a quadrature down-conversion path 121 is arranged in the test feedback signal processing unit 12. As shown in FIG. 5, the coupling end of the coupler is connected with an input end of the quadrature down-conversion path 121, and the PLL in the PM path is connected with another input end of the quadrature down-conversion path 121. The quadrature down-conversion path 121 includes a quadrature down-conversion circuit 1211. The quadrature down-conversion circuit 1211 divides the test feedback signal into two paths for quadrature down-conversion according to a carrier signal output by the PLL, to remove an intermediate-frequency carrier in the test feedback signal and extract the I/Q signal. Illustratively, in the present disclosure, the PM signal is controlled to have a fixed value in the test mode, so the signal output by the PLL is a carrier signal. An LPF and an Analog-Digital Converter (ADC) are arranged respectively in each receiving path in the quadrature down-conversion circuit 1211 to perform low pass filtering and analog-digital conversion respectively on each path of signal to obtain a baseband signal $r_i$, where $r_i$ may be represented as $r_i = g_{loop} \cdot (A_{ti} + AM_{offset}) \cdot A_{Pi}' \cdot \exp(j\varphi_i)$, where, $A_{ti}$, i=1,2 . . . represents amplitudes of the at least two test signals, $g_{loop}$ represents a loop gain, $A_{Pi}'$ represents an equivalent nonlinear amplitude coefficient of PA under transmit power corresponding to the current amplitude, $\varphi_i$ represents a receiving phase, and j is an imaginary number.

Based on the first mode, it is assumed that the at least two test signals include a first test signal and a second test signal. Correspondingly, the two test feedback signals include a first test feedback signal corresponding to the first test signal and a second test feedback signal corresponding to the second test signal, and the at least two baseband signals include a first baseband signal corresponding to the first test signal and a second baseband signal corresponding to the second test signal. In such case, the determining an amplitude offset value according to the at least two test signals and the at least two baseband signals includes: obtaining, by the amplitude offset determining unit 13, the amplitude offset value $AM_{offset}$ through a formula $$AM_{offset} = \frac{A_{t2} \cdot A_{r1} - A_{t1} \cdot A_{r2}}{A_{r2} - A_{r1}}$$

according to an amplitude $A_{t1}$ of the first test signal, an amplitude $A_{t2}$ of the second test signal, an amplitude mean $A_{r1}$ of the first baseband signal, and an amplitude mean $A_{r2}$ of the second baseband signal. It is to be understood that amplitudes of $r_i$ are averaged to obtain $A_{ri}$. After the transmitter sends an amplitude signal whose amplitude is $A_{t1}$ and an amplitude signal whose amplitude is $A_{t2}$, the receiver calculates $A_{r1}$ and $A_{r2}$. $A_{t1}$ and $A_{t2}$ may be set reasonably to make $A_{P1}' \approx A_{P2}'$. Further, the amplitude offset value $AM_{offset}$ may be calculated according to formula $$AM_{offset} = \frac{A_{t2} \cdot A_{r1} - A_{t1} \cdot A_{r2}}{A_{r2} - A_{r1}}.$$

Optionally, the electronic device has completed calibration of an IQ imbalance and a Direct Current (DC) offset before determining the amplitude offset value.

In the second mode, square transformation is performed respectively on each test feedback signal through a square transformation path to obtain the baseband signal corresponding to each test feedback signal.

Illustratively, a square transformation path 122 is arranged in the test feedback signal processing unit 12. As shown in FIG. 5, the coupling end of the coupler is connected with a squaring circuit of the square transformation path 122. The squaring circuit performs square transformation on the test feedback signal. Illustratively, an LPF and an ADC are further arranged in the square transformation path 122 to perform low pass filtering and analog-digital conversion on the signal subjected to square transformation to obtain a baseband signal $r_i$, where $r_i$ may be represented as $r_i = g_{loop} \cdot (A_{ti} + AM_{offset})^2 \cdot A_{Pi}' + d_{sq}$, where $A_{ti}$, i=1,2,3 . . . represents amplitudes of the at least two test signals, $g_{loop}$ represents a loop gain, and $d_{sq}$ represents a DC offset value of the squaring circuit.

Based on the second mode, it is assumed that the at least two test signals include a first test signal and a second test signal. Correspondingly, the at least two test feedback signals include a first test feedback signal corresponding to the first test signal, a second test feedback signal corresponding to the second test signal, and a third test feedback signal corresponding to the third test signal, and the at least two baseband signals include a first baseband signal corresponding to the first test signal, a second baseband signal corresponding to the second test signal, and a third baseband signal corresponding to the third test signal. In such case, the determining an amplitude offset value according to the at least two test signals and the at least two baseband signals includes: obtaining, by the amplitude offset determining unit 13, the amplitude offset value $AM_{offset}$ through a formula $$AM_{offset} = \frac{1}{2} \cdot \frac{(A_{r2} - A_{r1}) \cdot (A_{t3}^2 - A_{t2}^2) - (A_{r3} - A_{r2}) \cdot (A_{t2}^2 - A_{t1}^2)}{(A_{r3} - A_{r2}) \cdot (A_{t2} - A_{t1}) - (A_{r2} - A_{r1}) \cdot (A_{t3} - A_{t2})}$$

according to an amplitude $A_{t1}$ of the first test signal, an amplitude $A_{t2}$ of the second test signal, an amplitude $A_{t3}$ of the third test signal, an amplitude mean $A_{r1}$ of the first baseband signal, an amplitude mean $A_{r2}$ of the second baseband signal, and an amplitude mean $A_{r3}$ of the third baseband signal. It is to be understood that $A_{t1}$ and $A_{t2}$ may also be set reasonably to make $A_{P1}' \approx A_{P2}'$.

An embodiment of the present disclosure provides an amplitude offset calibration method, which may be applied to the electronic device in any one of the above-mentioned embodiments. Specific descriptions will be made below with several embodiments.

Figure 6:
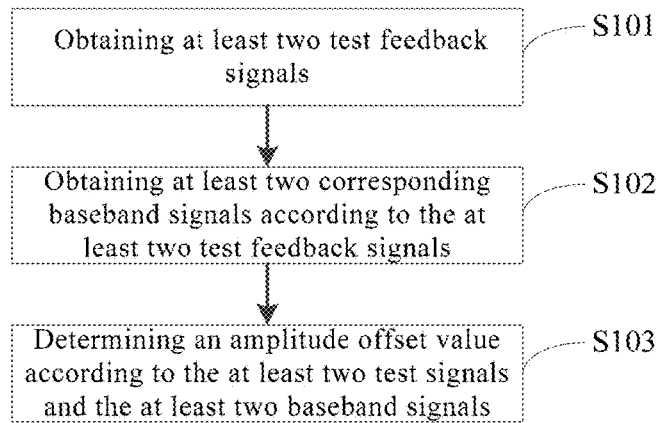
FIG. 6 is a schematic flowchart of an amplitude offset calibration method according to an embodiment of the present disclosure.

FIG. 6 is a schematic flowchart of an amplitude offset calibration method according to an embodiment of the present disclosure. As shown in FIG. 6, the method includes the following steps.

In S101, obtaining at least two test feedback signals.

The test feedback signals are analog signals obtained by the transmitter in a test mode according to a test signal. At least two test signals in one-to-one correspondence to the at least two test feedback signals are digital signals pre-generated by the transmitter. Amplitudes of the at least two test signals are different.

In S102, obtaining at least two corresponding baseband signals according to the at least two test feedback signals.

In S103, determining an amplitude offset value according to the at least two test signals and the at least two baseband signals.

The baseband signals are digital signals. The baseband signals are in one-to-one correspondence to the test feedback signals.

As an example, the obtaining at least two corresponding baseband signals according to the at least two test feedback signals includes: performing quadrature down-conversion processing respectively on each test feedback signal according to a carrier signal sent by the PLL of the transmitter to obtain the baseband signal corresponding to each test feedback signal.

Further, it is assumed that the at least two test signals include a first test signal and a second test signal, and the at least two baseband signals include a first baseband signal corresponding to the first test signal and a second baseband signal corresponding to the second test signal. The determining an amplitude offset value according to the at least two test feedback signals and the at least two baseband signals includes:

obtaining the amplitude offset value $AM_{offset}$ through a formula $$M_{offset} = \frac{A_{t2} \cdot A_{r1} - A_{t1} \cdot A_{r2}}{A_{r2} - A_{r1}}$$

according to an amplitude $A_{t1}$ of the first test signal, an amplitude $A_{t2}$ of the second test signal, an amplitude mean $A_{r1}$ of the first baseband signal, and an amplitude mean $A_{r2}$ of the second baseband signal.

As another example, the obtaining at least two corresponding baseband signals according to the at least two test feedback signals includes: performing square transformation respectively on each test feedback signal to obtain the baseband signal corresponding to the test feedback signal.

Further, it is assumed that the at least two test signals include a first test signal, a second test signal, and a third test signal, and the at least two baseband signals include a first baseband signal corresponding to the first test signal, a second baseband signal corresponding to the second test signal, and a third baseband signal corresponding to the third test signal. The determining an amplitude offset value according to the at least two test signals and the at least two baseband signals includes:

obtaining the amplitude offset value $AM_{offset}$ through a formula $$AM_{offset} = \frac{1}{2} \cdot \frac{(A_{r2} - A_{t1}) \cdot (A_{t3}^2 - A_{t2}^2) - (A_{r3} - A_{r2}) \cdot (A_{t2}^2 - A_{t1}^2)}{(A_{r3} - A_{r2}) \cdot (A_{t2} - A_{t1}) - (A_{r2} - A_{r1}) \cdot (A_{t3} - A_{t2})}$$

according to an amplitude $A_{t1}$ of the first test signal, an amplitude $A_{t2}$ of the second test signal, an amplitude $A_{t3}$ of the third test signal, an amplitude mean $A_{r1}$ of the first baseband signal, an amplitude mean $A_{r2}$ of the second baseband signal, and an amplitude mean $A_{r3}$ of the third baseband signal.

The amplitude offset value is used for calibrating an amplitude offset of the transmitter.

In the embodiment of the present disclosure, the at least two test feedback signals output by the output end of the transmitter are obtained, the at least two test feedback signals are processed to finally convert the at least two test feedback signals into the corresponding baseband signals in a digital domain, and then the amplitude offset value of the transmitter is determined according to the at least two baseband signals, such that the transmitter may compensate an AM signal according to the amplitude offset value to implement calibration of the amplitude offset.

In a specific implementation, after determining an amplitude offset value according to the at least two test signals and the at least two baseband signals, the method further includes: performing amplitude offset compensation on an AM signal according to the amplitude offset value, where the AM signal is obtained by performing coordinate rotation on a baseband signal generated by the transmitter.

In a specific implementation, before performing amplitude offset compensation on an AM signal according to the amplitude offset value, the method further includes: performing DPD processing on the baseband signal according to a pre-obtained DPD processing coefficient.

In a specific implementation, before performing DPD processing on the baseband signal according to a pre-obtained DPD processing coefficient, the method further includes: receiving an input training sequence, where the training sequence includes a plurality of training signals; activating the test mode to obtain the amplitude offset value in response to the received training sequence; obtaining a feedback signal corresponding to each training signal, where the feedback signal is an analog signal that has been compensated according to the amplitude offset value and output by the PA; determining the DPD processing coefficient according to the plurality of training signals and the corresponding feedback signals; and executing repeatedly the training process until a preset number of times is reached to obtain a final DPD processing coefficient.

Figure 7:
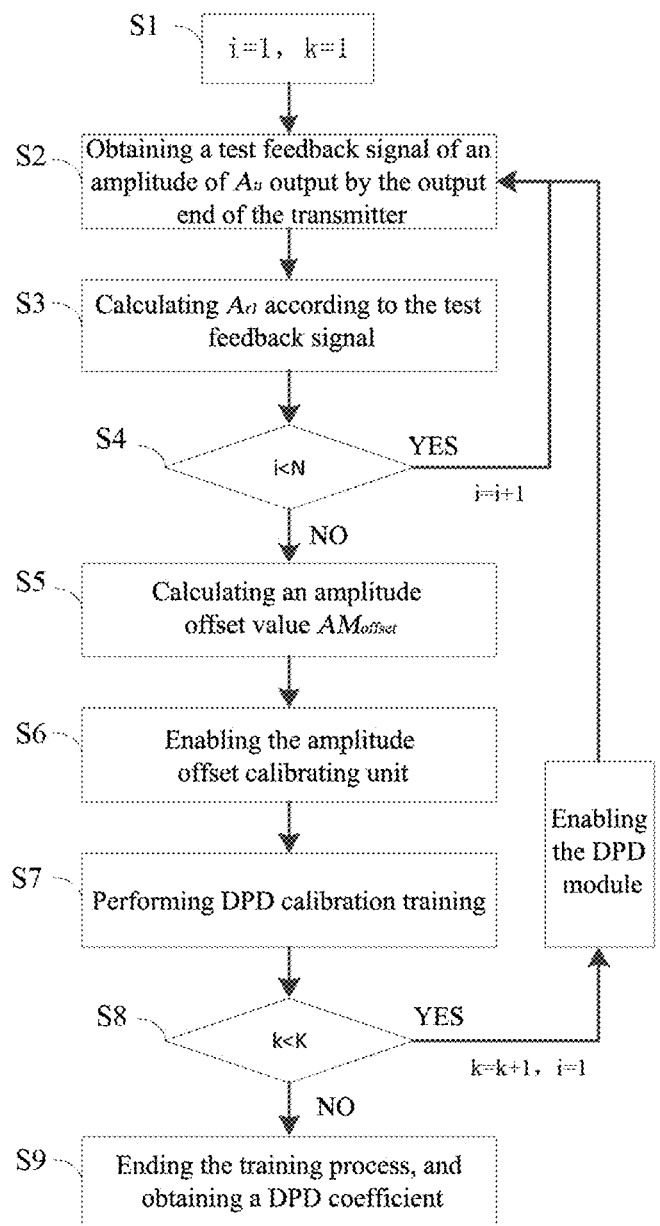
FIG. 7 is a schematic flowchart of an amplitude offset calibration method according to an embodiment of the present disclosure.

FIG. 7 is a schematic flowchart of an amplitude offset calibration method according to an embodiment of the present disclosure. Based on the above-mentioned embodiment, as shown in FIG. 7, the training process that combines DPD and the amplitude offset value to improve the accuracy thereof includes the following steps.

In S1, setting both values of i and k to 1 in response to a received training sequence.

In S2, obtaining a test feedback signal of an amplitude of $A_{ti}$ output by the output end of the transmitter.

In S3, calculating $A_{ri}$ according to the test feedback signal.

The calculation process has been described in the above-mentioned embodiment, and will not be elaborated herein.

In S4, determining whether i is less than a preset value N.

If i is less than N, 1 is added to i, and step S2 is returned to. If i is greater than N, step S5 is executed.

In S5, calculating an amplitude offset value $AM_{offset}$.

In S6, enabling the amplitude offset calibrating unit.

The amplitude offset calibrating unit is enabled to perform amplitude compensation on each training signal in the training sequence according to the amplitude offset value.

In S7, performing DPD calibration training.

The DPD module performs DPD calibration training according to the training sequence and a feedback signal corresponding to each training signal in the training sequence.

In S8, determining whether a number of times k of DPD calibration training is less than a preset number of times K.

If k is less than K, 1 is added to k, i=1 is set, the DPD module is enabled, and step S2 is returned to and executed. If k=K, step S9 is executed.

In S9, ending the training process, and obtaining a DPD coefficient.

The existence of the amplitude offset value $AM_{offset}$ may affect the DPD calibration effect for nonlinearity of the PA. In addition, nonlinearity of the PA may affect the calibration effect of $AM_{offset}$. The amplitude offset value calibration training method provided in the present disclosure may be combined with a common DPD calibration training method to improve the calibration accuracy of the both by iteration. In combination with the DPD calibration training process, DPD calibration training is performed after $AM_{offset}$ calibration is completed and compensation is started, and a DPD calibration training result is applied to $AM_{offset}$ calibration training in next iteration. A preset number of iterations is recorded as K. In addition to that iteration is stopped when the number is reached, iteration may be stopped ahead when a difference between two $AM_{offset}$ calibration training results is less than a set threshold.

An embodiment of the present disclosure also provides a non-transitory computer-readable storage medium. When an instruction in the storage medium is executed by a processor, the amplitude offset calibration method provided in the above-mentioned embodiment is performed.

An embodiment of the present disclosure also provides a chip running an instruction. The chip includes a memory and a processor. The memory stores a code and data. The memory is coupled to the processor. The processor runs the code in the memory such that the chip is configured to perform the steps of the amplitude offset calibration method as described above.

An embodiment of the present disclosure also provides a computer program product including an instruction. The computer program product, when running on a computer, enables the computer to perform the steps of the amplitude offset calibration method provided in the above-mentioned embodiment.

An embodiment of the present disclosure also provides a computer program, which, when running on a computer, enables the computer to perform the amplitude offset calibration method as described above.

It can be understood by those of ordinary skill in the art that all or part of the steps in the above-mentioned embodiments may be completed by hardware, or by a program by instructing related hardware. The program may be stored in a computer-readable storage medium. The above-mentioned storage medium may be a read-only memory, a magnetic disk, or an optical disk, etc.

The above is only the preferred embodiment of the present disclosure and not intended to limit the present disclosure. Any modifications, equivalent replacements, improvements, etc., made within the spirit and principle of the present disclosure shall fall within the scope of protection of the present disclosure.

What is claimed is:

1. An amplitude offset calibration method, applied to an electronic device, comprising:
   obtaining at least two test feedback signals, wherein the test feedback signals are analog signals obtained by a transmitter in a test mode according to a test signal, at least two test signals in one-to-one correspondence to the at least two test feedback signals are digital signals pre-generated by the transmitter, and amplitudes of the at least two test signals are different;
   obtaining at least two corresponding baseband signals according to the at least two test feedback signals, wherein the baseband signals are digital signals, and the baseband signals are in one-to-one correspondence to the test feedback signals; and
   determining an amplitude offset value according to the at least two test signals and the at least two baseband signals, wherein the amplitude offset value is used for calibrating an amplitude offset of the transmitter.

2. The method according to claim 1, wherein the obtaining at least two corresponding baseband signals according to the at least two test feedback signals comprises:
   performing quadrature down-conversion processing respectively on each test feedback signal according to a carrier signal sent by a Phase Locked Loop (PLL) of the transmitter to obtain a baseband signal corresponding to each test feedback signal.

3. The method according to claim 2, wherein the at least two test signals comprise a first test signal and a second test signal, and the at least two baseband signals comprise a first baseband signal corresponding to the first test signal and a second baseband signal corresponding to the second test signal; and the determining an amplitude offset value according to the at least two test signals and the at least two baseband signals comprises:
   obtaining the amplitude offset value $AM_{offset}$ through a formula $$AM_{offset} = \frac{A_{t2} \cdot A_{r1} - A_{t1} \cdot A_{r2}}{A_{r2} - A_{r1}}$$

according to an amplitude $A_{t1}$ of the first test signal, an amplitude $A_{t2}$ of the second test signal, an amplitude mean $A_{r1}$ of the first baseband signal, and an amplitude mean $A_{r2}$ of the second baseband signal.

4. The method according to claim 1, wherein the obtaining at least two corresponding baseband signals according to the at least two test feedback signals comprises:
   performing square transformation respectively on each test feedback signal to obtain the baseband signal corresponding to the test feedback signal.

5. The method according to claim 4, wherein the at least two test signals comprise a first test signal, a second test signal, and a third test signal, and the at least two baseband signals comprise a first baseband signal corresponding to the first test signal, a second baseband signal corresponding to the second test signal, and a third baseband signal corresponding to the third test signal; and the determining an amplitude offset value according to the at least two test signals and the at least two baseband signals comprises:
   obtaining the amplitude offset value $AM_{offset}$ through a formula $$AM_{offset} = \frac{1}{2} \cdot \frac{(A_{r2} - A_{r1}) \cdot (A_{t3}^2 - A_{t2}^2) - (A_{r3} - A_{r2}) \cdot (A_{t2}^2 - A_{t1}^2)}{(A_{r3} - A_{r2}) \cdot (A_{t2} - A_{t1}) - (A_{r2} - A_{r1}) \cdot (A_{t3} - A_{t2})}$$

according to an amplitude $A_{t1}$ of the first test signal, an amplitude $A_{t2}$ of the second test signal, an amplitude $A_{t3}$ of the third test signal, an amplitude mean $A_{r1}$ of the first baseband signal, an amplitude mean $A_{r2}$ of the second baseband signal, and an amplitude mean $A_{r3}$ of the third baseband signal.

6. The method according to claim 1, wherein after the determining an amplitude offset value according to the at least two test signals and the at least two baseband signals, the method further comprises:
   performing amplitude offset compensation on an Amplitude Modulator (AM) signal according to the amplitude offset value, wherein the AM signal is obtained by performing coordinate rotation on a baseband signal generated by a signal generating unit of the transmitter.

7. The method according to claim 6, wherein before the performing amplitude offset compensation on an AM signal according to the amplitude offset value, the method further comprises:

performing, according to a pre-obtained Digital Pre-Distortion (DPD) processing coefficient, DPD processing on the baseband signal generated by the signal generating unit of the transmitter.

8. The method according to claim 7, wherein before the performing, according to a pre-obtained DPD processing coefficient, DPD processing on the baseband signal generated by the signal generating unit of the transmitter, the method further comprises:

receiving an input training sequence, wherein the training sequence comprises a plurality of training signals;

activating the test mode to obtain the amplitude offset value in response to the received training sequence;

obtaining a feedback signal corresponding to each training signal, wherein the feedback signal is an analog signal that has been compensated according to the amplitude offset value and output by a Power Amplifier (PA);

determining the DPD processing coefficient according to the plurality of training signals and the corresponding feedback signals; and executing the training process repeatedly until a preset number of times is reached to obtain a final DPD processing coefficient.

9. An electronic device, comprising:

a memory and a processor, wherein the memory stores a code and data;

wherein the memory is coupled to the processor; and the processor runs the code in the memory such that the electronic device is configured to:

obtain at least two test feedback signals, wherein the test feedback signals are analog signals obtained by a transmitter in a test mode according to a test signal, at least two test signals in one-to-one correspondence to the at least two test feedback signals are digital signals pre-generated by the transmitter, and amplitudes of the at least two test signals are different;

obtain at least two corresponding baseband signals according to the at least two test feedback signals, wherein the baseband signals are digital signals, and the baseband signals are in one-to-one correspondence to the test feedback signals; and determine an amplitude offset value according to the at least two test signals and the at least two baseband signals, wherein the amplitude offset value is used for calibrating an amplitude offset of the transmitter.

10. The device according to claim 9, wherein the processor runs the code in the memory such that the electronic device is further configured to:

perform quadrature down-conversion processing respectively on each test feedback signal according to a carrier signal sent by a Phase Locked Loop (PLL) of the transmitter to obtain a baseband signal corresponding to each test feedback signal.

11. The device according to claim 10, wherein the at least two test signals comprise a first test signal and a second test signal, and the at least two baseband signals comprise a first baseband signal corresponding to the first test signal and a second baseband signal corresponding to the second test signal; and the processor runs the code in the memory such that the electronic device is further configured to:

obtain the amplitude offset value $AM_{offset}$ through a formula $$AM_{offset} = \frac{A_{t2} \cdot A_{r1} - A_{t1} \cdot A_{r2}}{A_{r2} - A_{r1}}$$

according to an amplitude $A_{t1}$ of the first test signal, an amplitude $A_{t2}$ of the second test signal, an amplitude mean $A_{r1}$ of the first baseband signal, and an amplitude mean $A_{r2}$ of the second baseband signal.

12. The device according to claim 9, wherein the processor runs the code in the memory such that the electronic device is further configured to:

perform square transformation respectively on each test feedback signal to obtain a baseband signal corresponding to the test feedback signal.

13. The device according to claim 12, wherein the at least two test signals comprise a first test signal, a second test signal, and a third test signal, and the at least two baseband signals comprise a first baseband signal corresponding to the first test signal, a second baseband signal corresponding to the second test signal, and a third baseband signal corresponding to the third test signal; and the processor runs the code in the memory such that the electronic device is further configured to:

obtain the amplitude offset value $AM_{offset}$ through a formula $$AM_{offset} = \frac{1}{2} \cdot \frac{(A_{r2} - A_{r1}) \cdot (A_{t3}^2 - A_{t2}^2) - (A_{r3} - A_{r2}) \cdot (A_{t2}^2 - A_{t1}^2)}{(A_{r3} - A_{r2}) \cdot (A_{t2} - A_{t1}) - (A_{r2} - A_{r1}) \cdot (A_{t3} - A_{t2})}$$

according to an amplitude $A_{t1}$ of the first test signal, an amplitude $A_{t2}$ of the second test signal, an amplitude $A_{t3}$ of the third test signal, an amplitude mean $A_{r1}$ of the first baseband signal, an amplitude mean $A_{r2}$ of the second baseband signal, and an amplitude mean $A_{r3}$ of the third baseband signal.

14. The device according to claim 9, wherein the processor runs the code in the memory such that the electronic device is further configured to:

perform amplitude offset compensation on an Amplitude Modulator (AM) signal according to the amplitude offset value, wherein the AM signal is obtained by performing coordinate rotation on a baseband signal generated by the transmitter.

15. The device according to claim 14, wherein the processor runs the code in the memory such that the electronic device is further configured to:

perform, according to a pre-obtained Digital Pre-Distortion (DPD) processing coefficient, DPD processing on the baseband signal generated by the transmitter.

16. The device according to claim 15, wherein the processor runs the code in the memory such that the electronic device is further configured to:

receive an input training sequence, wherein the training sequence comprises a plurality of training signals;

activate the test mode to obtain the amplitude offset value in response to the received training sequence;

obtain a feedback signal corresponding to each training signal, wherein the feedback signal is an analog signal that has been compensated and output by a Power Amplifier (PA);

determine the DPD processing coefficient according to the plurality of training signals and the corresponding feedback signals; and perform the training process repeatedly until a preset number of times is reached to obtain a final DPD processing coefficient.

17. A non-transitory storage medium, comprising a readable storage medium and a computer program, wherein the computer program is configured to cause a processor to:
obtain at least two test feedback signals, wherein the test feedback signals are analog signals obtained by a transmitter in a test mode according to a test signal, at least two test signals in one-to-one correspondence to the at least two test feedback signals are digital signals pre-generated by the transmitter, and amplitudes of the at least two test signals are different;
obtain at least two corresponding baseband signals according to the at least two test feedback signals, wherein the baseband signals are digital signals, and the baseband signals are in one-to-one correspondence to the test feedback signals; and
determine an amplitude offset value according to the at least two test signals and the at least two baseband signals, wherein the amplitude offset value is used for calibrating an amplitude offset of the transmitter.

18. The non-transitory storage medium according to claim 17, wherein the computer program is further configured to cause a processor to:
perform quadrature down-conversion processing respectively on each test feedback signal according to a carrier signal sent by a Phase Locked Loop (PLL) of the transmitter to obtain a baseband signal corresponding to each test feedback signal.

19. The non-transitory storage medium according to claim 18, wherein the at least two test signals comprise a first test signal and a second test signal, and the at least two baseband signals comprise a first baseband signal corresponding to the first test signal and a second baseband signal corresponding to the second test signal; and the computer program is further configured to cause a processor to:
obtain the amplitude offset value $AM_{offset}$ through a formula $$AM_{offset} = \frac{A_{t2} \cdot A_{r1} - A_{t1} \cdot A_{r2}}{A_{r2} - A_{r1}}$$

according to an amplitude $A_{t1}$ of the first test signal, an amplitude $A_{t2}$ of the second test signal, an amplitude mean $A_{r1}$ of the first baseband signal, and an amplitude mean $A_{r2}$ of the second baseband signal.

20. The non-transitory storage medium according to claim 17, wherein the computer program is further configured to cause a processor to:
perform square transformation respectively on each test feedback signal to obtain the baseband signal corresponding to the test feedback signal.

* * * * *